(12) United States Patent
Colomina

(10) Patent No.: US 11,566,731 B1
(45) Date of Patent: Jan. 31, 2023

(54) APPARATUS FOR THE ALIGNMENT OF PIPES

(71) Applicant: Tony Colomina, Hillsboro, OR (US)

(72) Inventor: Tony Colomina, Hillsboro, OR (US)

(*) Notice: Subject to any disclaimer, the term of this patent is extended or adjusted under 35 U.S.C. 154(b) by 227 days.

(21) Appl. No.: 17/092,283

(22) Filed: Nov. 8, 2020

Related U.S. Application Data

(60) Provisional application No. 62/933,440, filed on Nov. 9, 2019.

(51) Int. Cl.
*F16L 23/00* (2006.01)
*F16L 23/036* (2006.01)

(52) U.S. Cl.
CPC .......... *F16L 23/003* (2013.01); *F16L 23/036* (2013.01)

(58) Field of Classification Search
CPC .................................................. F16L 23/003
See application file for complete search history.

(56) References Cited

U.S. PATENT DOCUMENTS

| | | | |
|---|---|---|---|
| 2,280,005 A | 4/1942 | Petersen | |
| 2,417,013 A | 3/1947 | Petersen | |
| 2,451,702 A | 10/1948 | Weigard | |
| 2,463,721 A | 3/1949 | Spencer, Jr. | |
| 2,481,866 A | 9/1949 | Petersen | |
| 2,496,309 A | 2/1950 | Pugh | |
| 2,696,747 A | 12/1954 | Bergan | |
| 2,800,867 A | 7/1957 | Smith | |
| 3,290,971 A | 12/1966 | Belval | |
| 3,400,872 A * | 9/1968 | Rogers | B23K 37/0533 269/287 |
| 3,669,051 A * | 6/1972 | Conway | E04D 15/04 248/237 |
| 3,735,472 A | 5/1973 | Silverman | |
| 4,297,756 A | 11/1981 | Lance | |
| 4,413,415 A * | 11/1983 | Stovall | G01B 5/25 269/902 |
| 5,165,160 A * | 11/1992 | Poncelet | B23K 37/0533 228/49.3 |
| 5,305,669 A | 4/1994 | Kimbro | |
| 5,582,084 A | 12/1996 | Sarmiento | |
| 5,865,430 A * | 2/1999 | Conover | B23K 37/0533 29/272 |
| 5,908,210 A * | 6/1999 | Fetzer | F16L 37/002 285/368 |
| 6,016,592 A | 4/2000 | Lavendar | |
| 6,330,840 B1 | 12/2001 | McComick | |
| 6,775,890 B2 * | 8/2004 | Kolarik | B25B 27/10 29/244 |
| 8,899,088 B1 | 12/2014 | Hazen | |
| 9,687,941 B2 | 6/2017 | McClure | |

(Continued)

*Primary Examiner* — Kevin R Barss
(74) *Attorney, Agent, or Firm* — J. Curtis Edmondson; Law Offices of J. Curtis Edmondson

(57) ABSTRACT

This invention provides for a hand-held clamping tool to position and hold two pipe flanges in place allowing for the alignment the bolt holes and the gasket that in placed between the pipe flanges by using an alignment spike; and then holding the pipe flange and the gaskets in place while bolts are installed to join the two gasket sections together. The invention also has a detachable alignment spike and a also has a calibration mark on the alignment spike. The invention also describes a tool for positioning and holding ISO flanges.

21 Claims, 8 Drawing Sheets

(56) References Cited

U.S. PATENT DOCUMENTS

| | | | |
|---|---|---|---|
| 2007/0256288 A1* | 11/2007 | Vermaat | B23K 37/0533 |
| | | | 228/44.5 |
| 2008/0230972 A1* | 9/2008 | Ganley | B25B 5/003 |
| | | | 269/287 |
| 2011/0067184 A1 | 3/2011 | Robert | |
| 2012/0174372 A1* | 7/2012 | Dagenais | B23Q 16/00 |
| | | | 29/428 |
| 2015/0165672 A1* | 6/2015 | Montgomery | B23P 19/04 |
| | | | 156/391 |
| 2016/0066956 A1* | 3/2016 | Siemer | A61B 17/6416 |
| | | | 606/56 |
| 2017/0167297 A1* | 6/2017 | Merlau | F23R 3/60 |
| 2019/0358781 A1* | 11/2019 | Valento | B25B 7/02 |

\* cited by examiner

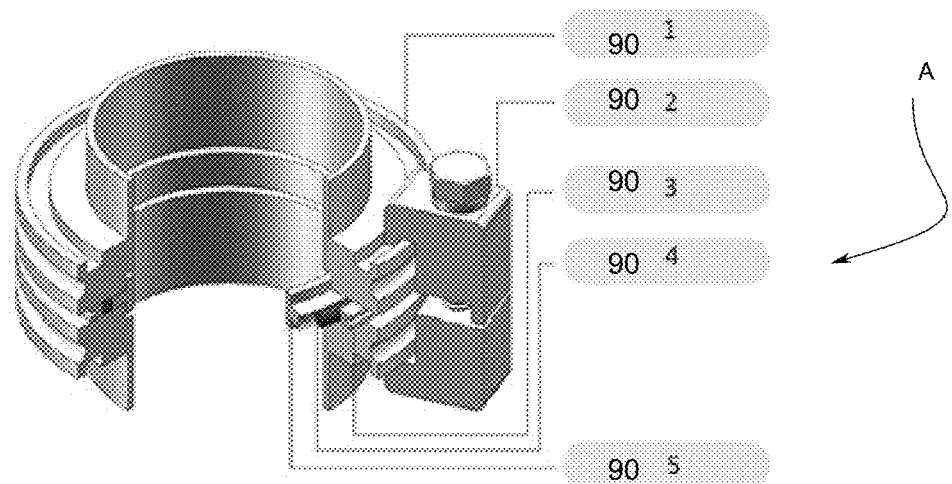
FIG 9A
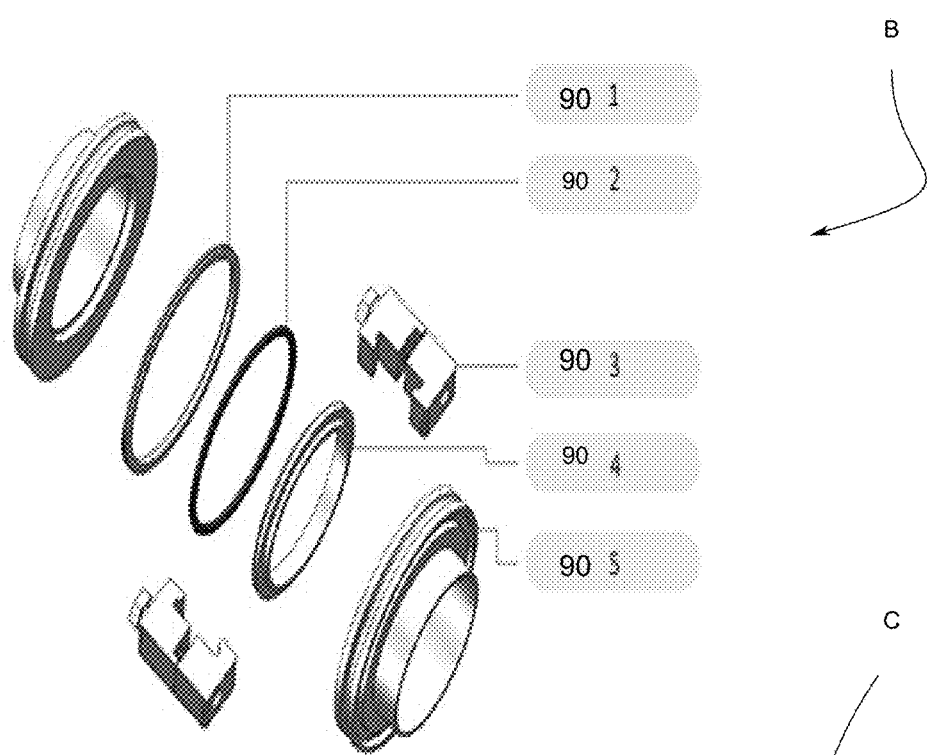
FIG 9B
FIG 9C
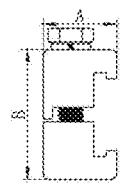
FIG 9D
FIG 9

APPARATUS FOR THE ALIGNMENT OF PIPES

CROSS-REFERENCE TO RELATED APPLICATIONS

This application claims the benefit of U.S. Provisional Application No. 62/933,440 titled "APPARATUS FOR THE ALIGNMENT OF PIPES" which was filed on Nov. 9, 2019 and is incorporated by reference in its entirety.

FIELD

The field of this invention is tooling for alignment of pipes during installation and bonding of those pipes.

BACKGROUND

Facilities that use chemicals to produce products often have long pipe sections distributing the chemical products to the various machines that use the chemicals. For example, pharmaceutical companies use precursor chemicals in the final manufacture of drugs, semiconductor companies use chemicals to process wafers, and energy companies use pipe sections to distribute distillates.

Installation of long pipe section often involves joining of those pipe sections using flanged connectors at each end of the pipe section. These flange connectors typically have bolt holes to allow the installation of, and then the tightening of these bolts to connect the pipes. Once the bolts are tightened each pipe section abuts the other and a seal is formed.

The connection from two abutted pipes often does not form a perfect seal. This is because the flanges are not perfectly level and smooth. Also, the bolts connecting the pipes between the pipes may It is also normal to have a gasket installed between the pipe sections and the purpose of the gasket is to provide a seal between the individual pipe sections. The problem of installing long pipe sections is that the pipes are sometimes located in ceiling areas where installation can be difficult as a single pipefitter is usually on a ladder and must hold and simultaneously align the pipe. Further the alignment of the gasket is also difficult.

Typical pipe flanges have been specified by the ASME (American Society of Mechanical Engineers) and typically have a flange portion with holes for bolts. Pipe flanges that are made to standards called out by ASME B16.5 or ASME B16.47, and MSS SP-44. They are typically made from forged materials and have machined surfaces. ASME B16.5 refers to nominal pipe sizes (NPS) from ½" to 24". B16.47 covers NPSs from 26" to 60". Each specification further delineates flanges into pressure classes: 150, 300, 400, 600, 900, 1500 and 2500 for B16.5, and B16.47 delineates its flanges into pressure classes 75, 150, 300, 400, 600, 900. However these classes do not correspond to maximum pressures in psi. Instead, the maximum pressure depends on the material of the flange and the temperature. For example, the maximum pressure for a Class 150 flange is 285 psi, and for a Class 300 Flange it is 740 psi (both are for ASTM A105 Carbon Steel and temperatures below 100 F).

The gasket type and bolt type are generally specified by the standard(s); however, sometimes the standards refer to the ASME Boiler and Pressure Vessel Code (B&PVC) for details (see ASME Code Section VIII Division 1—Appendix 2). These flanges are recognized by ASME Pipe Codes such as ASME B31.1 Power Piping, and ASME B31.3 Process Piping.

Materials for flanges are usually under ASME designation: SA-105 (Specification for Carbon Steel Forgings for Piping Applications), SA-266 (Specification for Carbon Steel Forgings for Pressure Vessel Components), or SA-182 (Specification for Forged or Rolled Alloy-Steel Pipe Flanges, Forged Fittings, and Valves and Parts for High-Temperature Service). In addition, there are many "industry standard" flanges that in some circumstance may be used on ASME work.

The product range includes SORF, SOFF, BLRF, BLFF, WNRF (XS, XXS, STD & Schedule 20, 40, 80), WNFF (XS, XXS, STD & Schedule 20, 40, 80), SWRF (XS & STD), SWFF (XS & STD), threaded RF, threaded FF & LJ, with sizes from ½" to 16". The bolting material used for flange connection is stud bolts mated with two nut (washer when required). In petrochemical industries, ASTM A193 B7 STUD & ASTM A193 B16 stud bolts are used as these have high tensile strength.

Pipe alignment tools have been documented in United States Issued Patent No.'s: U.S. Pat. No. 2,451,702 to Weigand; U.S. Pat. No. 2,800,867 to Smith; U.S. Pat. No. 3,290,971 to Belval; U.S. Pat. No. 3,735,472 to Silverman; U.S. Pat. No. 6,016,592 to Lavender, U.S. Pat. No. 6,330,840 to McCormick, et. al. None of these aforementioned tools solve the problem of the concurrent alignment of pipes with flanges while simultaneously holding those pipes into place.

Therefore, there is a need for a novel and improved clamp for the alignment of pipes during the installation and coupling of the pipes.

SUMMARY

This invention solves the problem of holding pipe flanges in place, aligning the bolt holes and gaskets, and then holding the pipe flange and the gaskets in place while bolts are installed to join the two gasket sections together.

The described invention describes a pipe holding and alignment tool for the joining of two pipes with flanges with an alignment clamp having an upper clamping teeth and a lower clamping teeth that grip the outer surfaces of pipe flanges attached to the end of pipes. The upper alignment clamp has affixed to it an alignment spike that is positioned to thrust in the direction of the clamping motion and allows for the insertion into the upper flange bolt hole and then through to a lower flange bolt hole of the second pipe, so that the alignment spike aligns the two flange bolt holes. Further the alignment spikes can be permanently affixed to the jaws of the locking pliers or it can be detachable. The alignment spike may be perpendicular to the jaws of the locking pliers, but may also be off center or curved. The alignment spike may be made of rigid material that can be reused, but the material may be single use or disposable. Further the alignment spike may be coated to prevent any damage to any internal structures of the holes. The alignment spikes may also have calibration lines or notches to insure to avoid excessive clamping forces. In the instance where there sealing gasket placed between the two flanges, the alignment spike may be coated with a substance to indicate if the alignment spike comes into contact with the gasket to either indicate the presence of the gasket or to determine if the gasket is mis-seated. The invention also contemplates a calibration mark on the spike allowing for visual verification by the technician or engineer that the flanges are properly seated and installed.

An alternate implementation of the pipe holding and alignment tool for the joining of two pipes with slotted flanges an bracket alignment clamp has an upper clamping jaw with upper clamping teeth and a lower clamping jaw with lower clamping teeth and when compressed they simultaneously gripping of the outer surfaces of ISO flange slots, and when they move towards each other, the first pipe and second pipe are aligned. This compressive force is usually accomplished with the locking pliers, but may also be slip joint pliers, lineman's pliers, needle-nose pliers, bent-nose pliers, pincers, tongue and groove pliers, round-nose pliers. Also the jaws may be drawn together by either mechanical, electromagnetic, or mechanical forces. The alignment brackets may be fixed or movable and orientated to allow the clamping from above or below.

The use of the inventions described above is the facilitate the installation of flanged pipe strings by technicians and engineers. This involves positioning a first pipe flange close to a second pipe with a second pipe flange, then attaching a first pipe holding and alignment tool (either with the alignment spike or alignment bracket) so that pipe flanges are held together by the compressive force of the locking pliers. It is contemplated that more than one pipe holding and alignment tool will need to be installed to completely align the pipe as the pipes may slightly shift. Once one or more pipe holding and alignment tools are attached and the pipes are aligned then the either bolts may installed through the holes or double clamps may be installed.

BRIEF DESCRIPTION OF THE DRAWINGS

The present invention is better understood by referring to the following drawings and the corresponding reference numerals. The components in the drawings are not necessarily to scale, emphasis instead being placed upon clearly illustrating the principles of the present invention.

FIG. 9A-9D is a reference to a pipe flange with slots.

DETAILED DESCRIPTION

Figure 1:
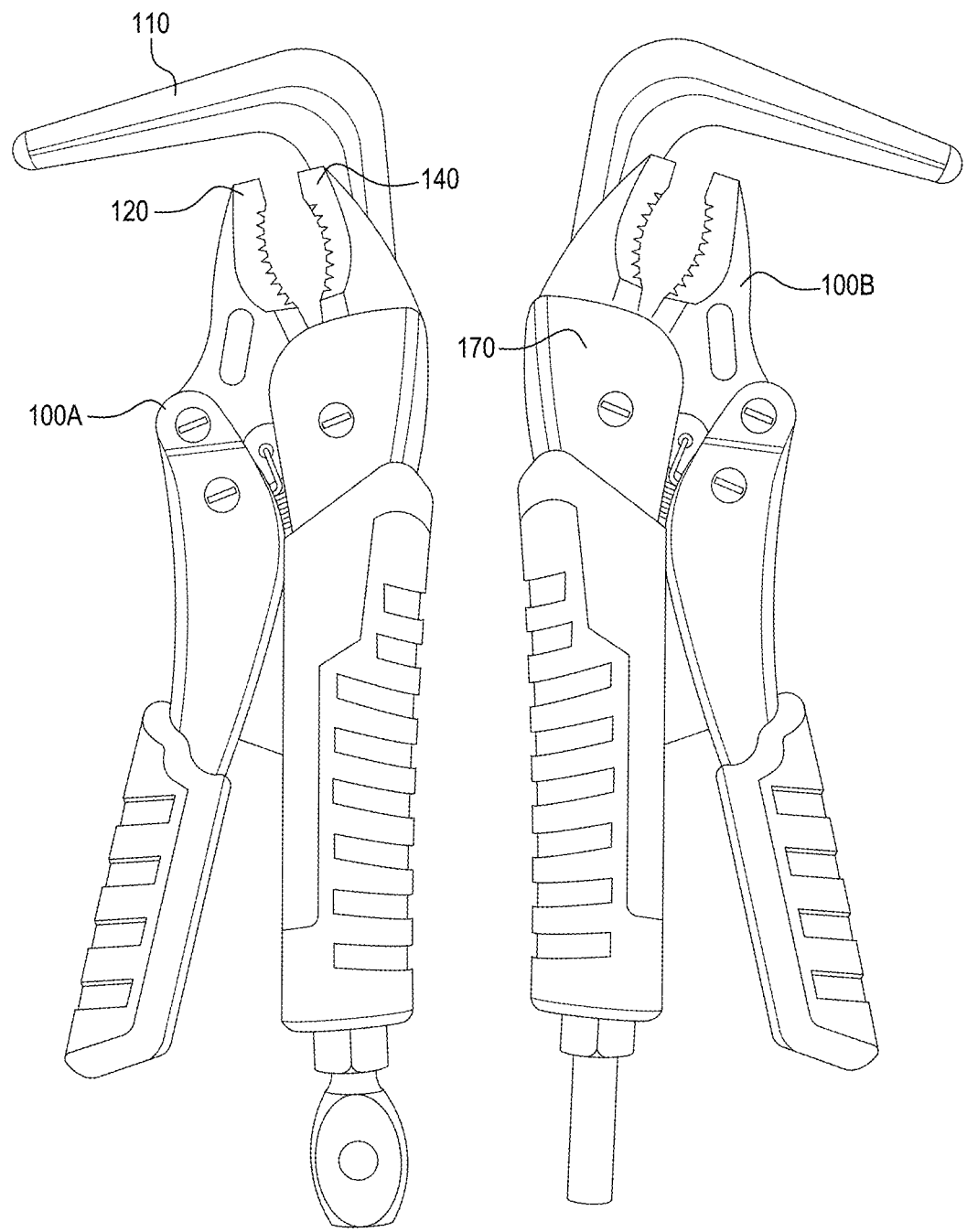
FIG. 1 is a top view of two images of the apparatus depicting both right hand and left hand orientations.

Embodiments will now be described in detail, by way of example, with reference to the drawings, where like reference numerals represent like parts throughout the various drawing figures.

Alignment Clamps for Gaskets with Holes

FIG. 1 depicts the side view of two alignment clamps 100A,1100B with reflexive orientations. The alignment clamp 110A are a left spike 110 facing view and the alignment clamp 110B is a right spike 110 facing view. A reference to alignment clamp 110 will refer to either orientation.

The alignment clamps 110A, 110B are formed from any form of plier type construction that allows for the application of an opposite compressive force between jaws 120, 140, while the closure of those pliers can be locked into place. Representative prior art clamps without the spike are typically known as "Vise Grips" or generically as locking pliers, but can be any type of clamping device where the gripping portions are brought together, such as slip joint pliers, lineman's pliers, needle-nose pliers, bent-nose pliers, pincers, tongue and groove pliers, round-nose pliers. While the use of a locking plier is probably the most commonplace, other plier configurations can be use that achieve the same result, such as, standard pliers with elastic strap that pulls the two handles together; a bolt and nut configuration through the handles where the nut tightens to handles towards each other; an electromechanical configuration where an electromotive force pushes the two jaws 120,140 so that they apply a compressive force towards each other, a magnet configuration where opposite magnetic forces in the two jaws 120,140 attract each other; and any form of clamp, such as a c-clamp.

The clamps 100 has jaws 120,150 for clamping, via a compressive force, two pieces of metal, typically gaskets. Attached to one of the clamping teeth is a spike 110. The spike 110 is to insert and align two opposing gaskets (not shown) that the have bolt holes for joining two sections of pipe (not shown). The jaws 120,150 hold the two gaskets together are held together by the normal operation of locking pliers. The amount of pressure on the two gaskets is determined by the pressure adjustment 140 part of the locking pliers. As noted above, the pressure adjustment 140 for clamping pliers has equivalent implementations for other types of pliers.

The spike 110 can be permanently attached (e.g. molded, glued, soldered, or welded) onto the jaw or can be detachable via a coupling point 170. Other implementations of a detachable spike involve a removable insert, such as those found on ratchet sets, a bolted assembly, or any other mechanical assembly that connects the spike proximate to the clamping area. The spike 110 can be aligned at any angle relative to direction of the clamp to facilitate the clamping mechanism. While the spike 110 will typically be parallel to the face of the jaws 120,150 with the spike 110 inserting directly downwards as the jaws are pulled together, the invention contemplates that the orientation of the spike may be aligned not directly downwards such that the spike moves at a displaced angle. The angle displacement will generally not be more than 10 degrees off center, but may be approximately 10 degrees, 15 degrees, 20 degrees, etc. but implementations more than 45 degrees is unlikely. Further, while the spike will typically be tapered and straight, it may also be curvilinear and not tapered.

Figure 2:
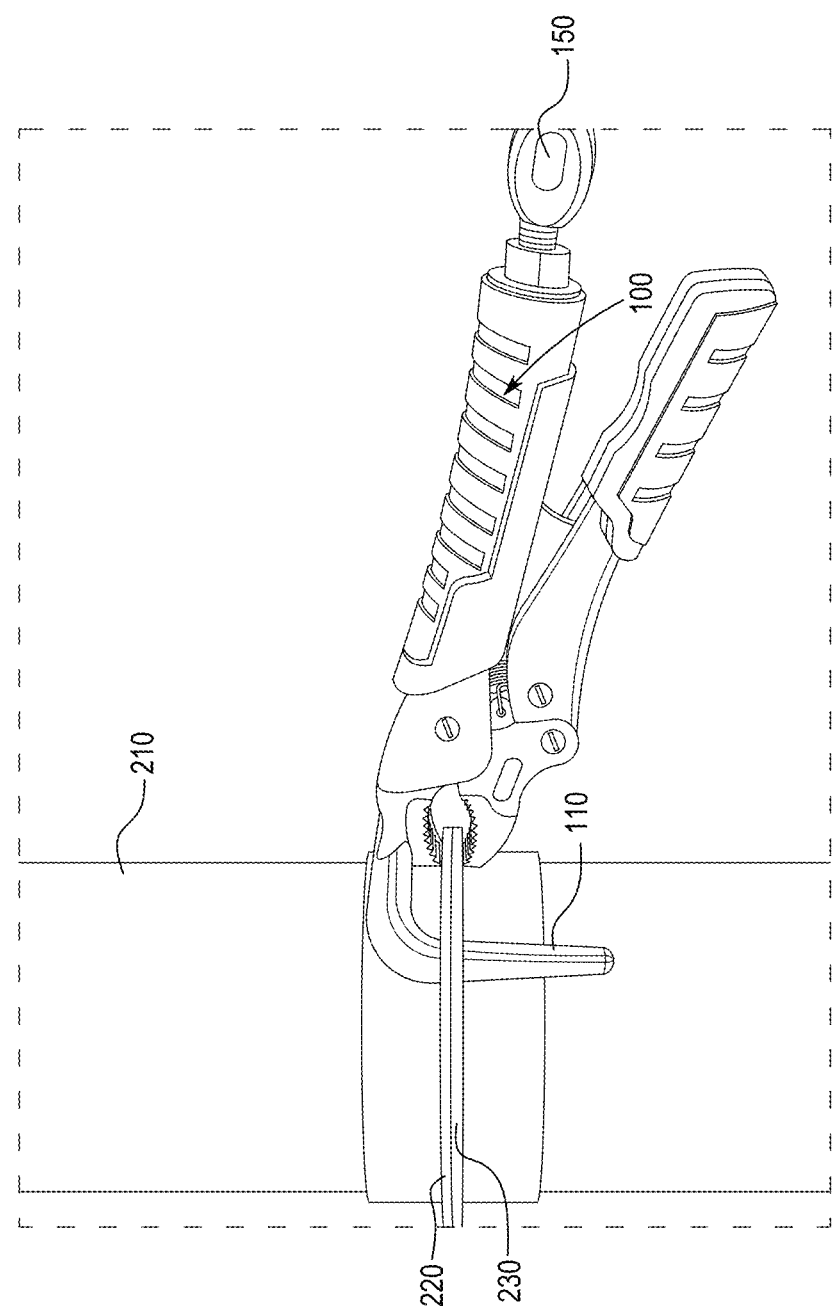
FIG. 2 depicts the alignment clamp used in conjunction with a pipe flange.

FIG. 2 depicts an alignment clamp 100 in use. The alignment clamp 100 is placed over a flange 210 that is affixed to a pipe 210. The spike 110 is inserted into the holes of a pipe flange. As noted in FIG. 2, there are cases where there is difficulty in both clamping each flange, aligning the bolt holes, and holding in place while bolts are installed to clamp the two pipe sections together.

Figure 3:
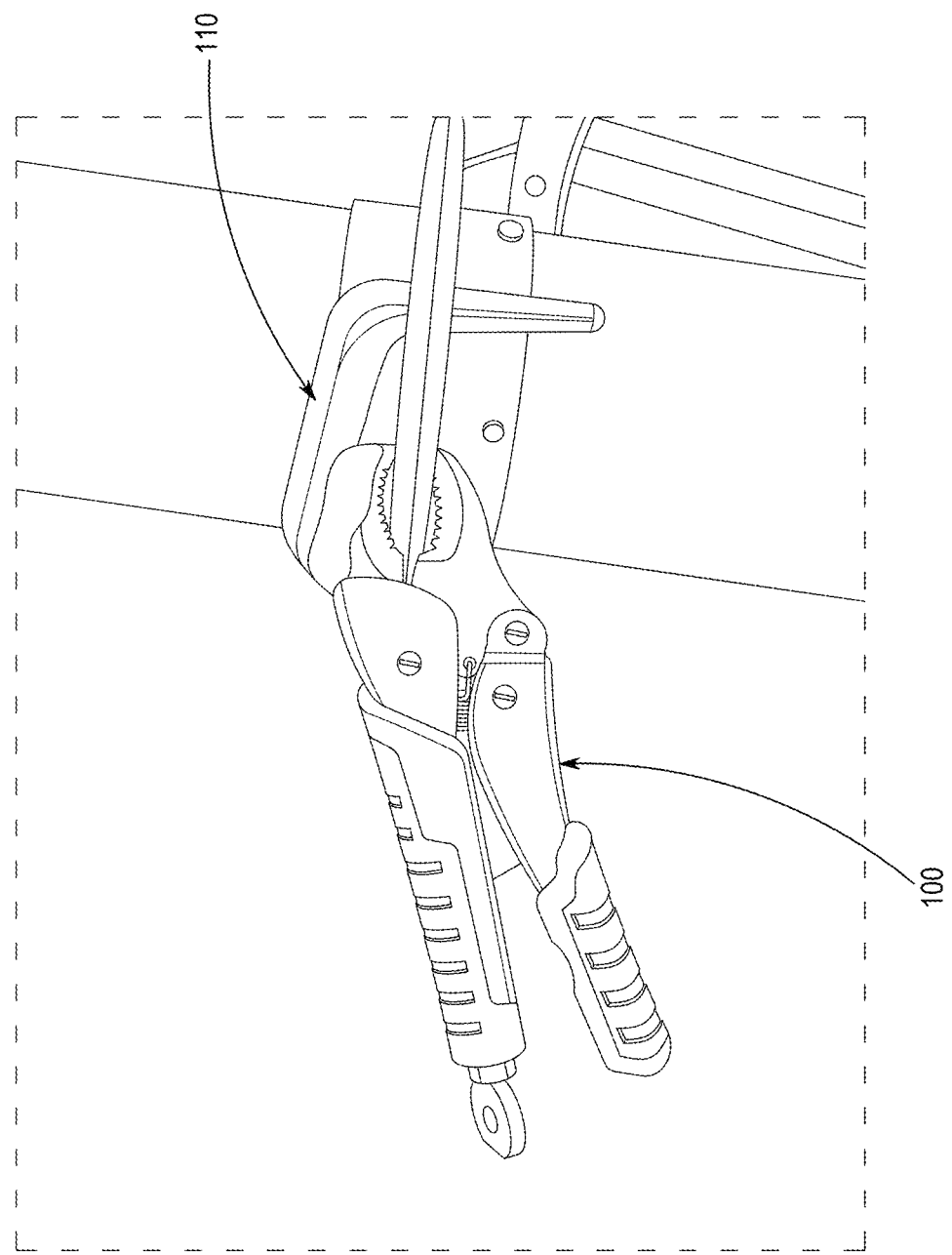
FIG. 3 is a side view of the invention showing the alignment clamp.

FIG. 3 is a side view of the invention showing the alignment clamp 100 with the spike 110 inserted into the flange hole and binding the two flange pieces together. During the clamping process, the pipefitter has the ability to position the pipe before finally clamping the two sections of pipe together.

Figure 4:
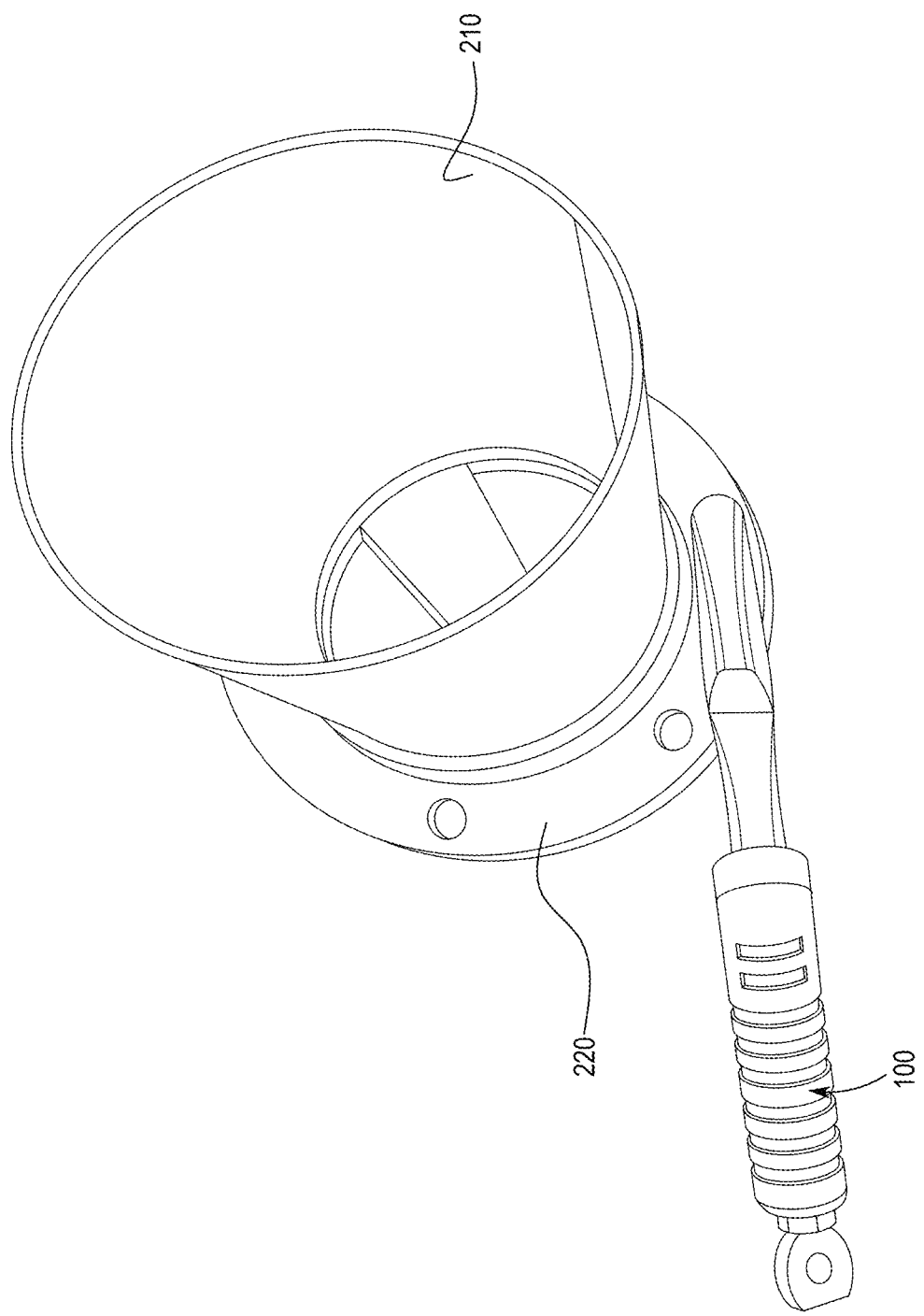
FIG. 4 is a top view of the invention showing the alignment clamp.
Figure 5:
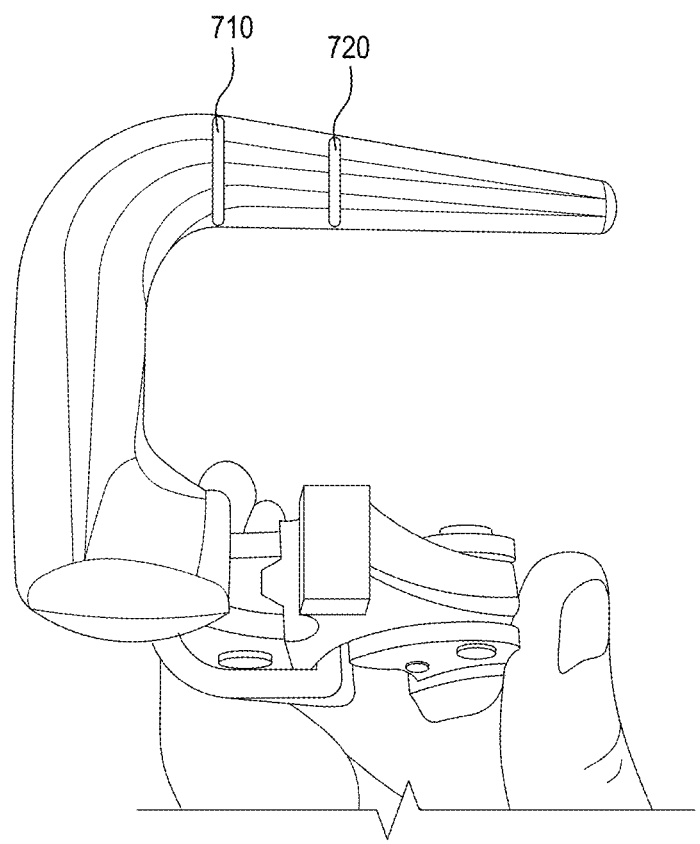
FIG. 5 depicts the alignment clamp with calibration marks.

FIG. 4 is a top view of the invention showing the alignment clamp 100 with the spike 110 inserted into the flange hole and binding the two flange pieces together FIG. 5 depicts an alternate embodiment of the invention. The alignment spike 110 may also have one or more calibration marks 710, 720 on the alignment spike to indicate visual calibration points. In some situations, a compressible gasket is placed between the two flanges to join the two pipes and to prevent leakage. In this situation, the use of the alignment spike involves the insertion in the flange hole of the the alignment clamp and compressing the clamps until the calibration mark is reached. The mark will assist the user of over compression of the gasket by the clamps.

Referring collectively to FIG. 1-5, in one implementation, a pipe flange has an outer diameter of 6 inches and inner diameter of 4 inches, and the flange portion is approximately ¾" in width. The pipe flange has six equispaced holes that are approximately ⅜" in diameter. The alignment spike is made of metal that is either square or rounded metal bar of ½" in diameter, welded perpindularly to one part of the clamp, at ½" the spike bends 90 degrees and tapers down to a point over a length of 2". The tapered conical point allows for the easy insertion.

Alignment Clamps with Brackets for ISO Flanges Bolt Nipple Assembly

Referring to FIG. 9 which shows an exploded assembly of an ISO vacuum fittings for connecting pipe systems, which consists of an iso flange 901, a double claw fitting 902, and outer ring 903, an o-ring 904, and a centering ring 905. These ISO assemblies are well known in piping systems. Prior to assembly, the fittings are either welded, soldered, and/or glued to the pipe string. The pipes are then butt connected using the double claw fitting 902 where the double claw fitting fits over the lip of the outer ring, and the bolt on the double claw fitting is tightened down to make a tight seal between the two ISO flanges.

Figure 6:
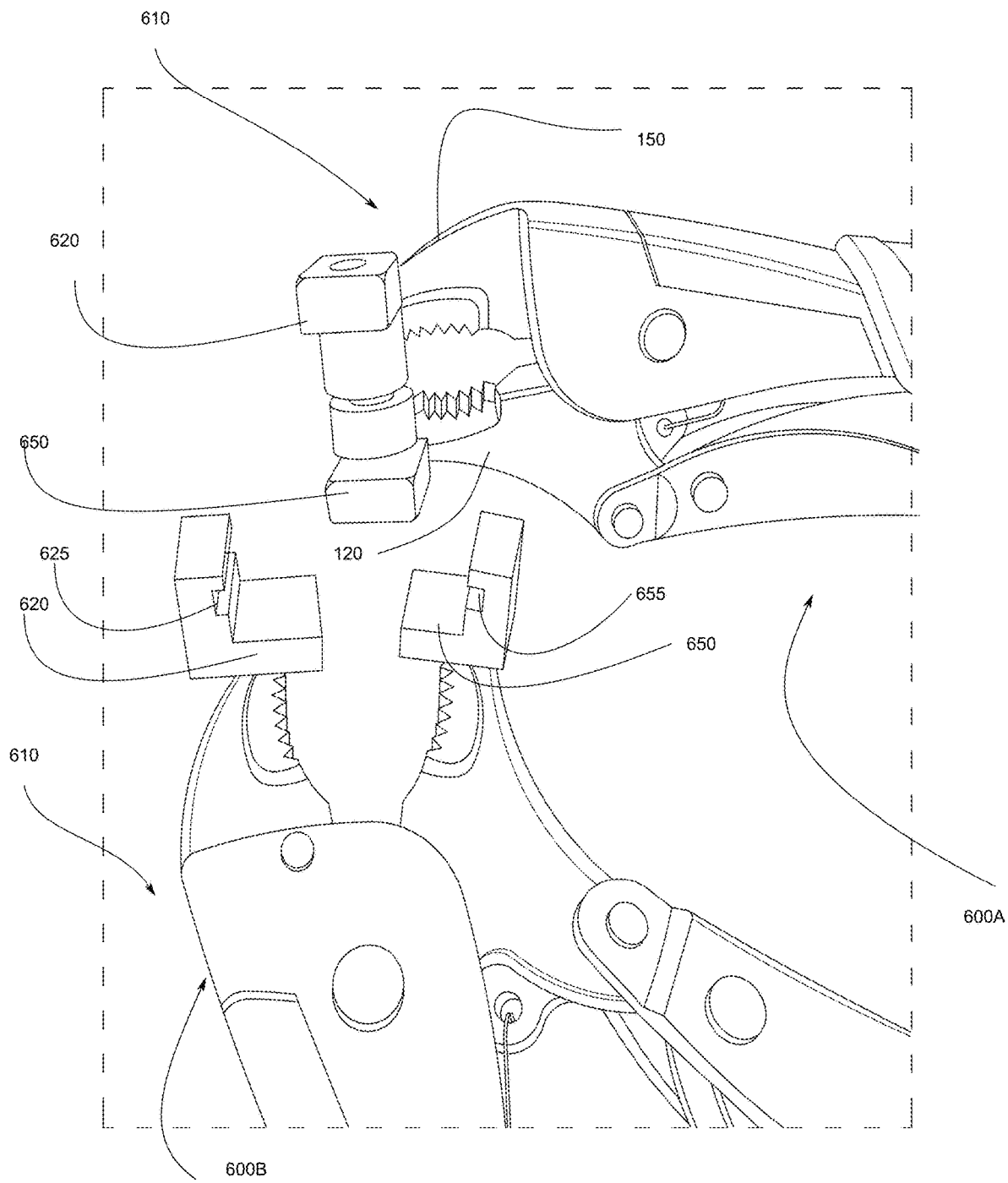
FIG. 6 are twp different views of the alternative embodiment of the ISO clamp.

Now referring to FIGS. 6A-6B. The alignment bracket clamps 110A, 110B are formed from any form of plier type construction that allows for the application of an opposite compressive force between jaws 120, 140, while the closure of those pliers can be locked into place. The alignment bracket clamps have modified jaws, 620, 650 that have that feature pipe alignment slots 625,655 that are capable of clasping the lip 640 of a flange Now referring to FIGS. 6A-6B which shows two alternate alignment clamps 600A, 600B which are an alternate implementation of the alignment clamps 100A,100B. In one orientation, 600A, the clamp section of the pipe alignment tool is directly viewed, and in the second orientation, the clamp section of the pipe alignment tool the clamp section is viewed from the side perspective. Representative prior art clamps without the spike are typically known as "Vise Grips" or generically as locking pliers, but can be any type of clamping device where the gripping portions are brought together, such as slip joint pliers, lineman's pliers, needle-nose pliers, bent-nose pliers, pincers, tongue and groove pliers, round-nose pliers. While the use of a locking plier is probably the most common-place, other plier configurations can be use that achieve the same result, such as, standard pliers with elastic strap that pulls the two handles together; a bolt and nut configuration through the handles where the nut tightens to handles towards each other; an electromechanical configuration where an electromotive force pushes the two jaws 620,650 so that they apply a compressive force towards each other, a magnet configuration where opposite magnetic forces in the two jaws 120,140 attract each other; and any form of clamp, such as a c-clamp.

Figures 7, 8:
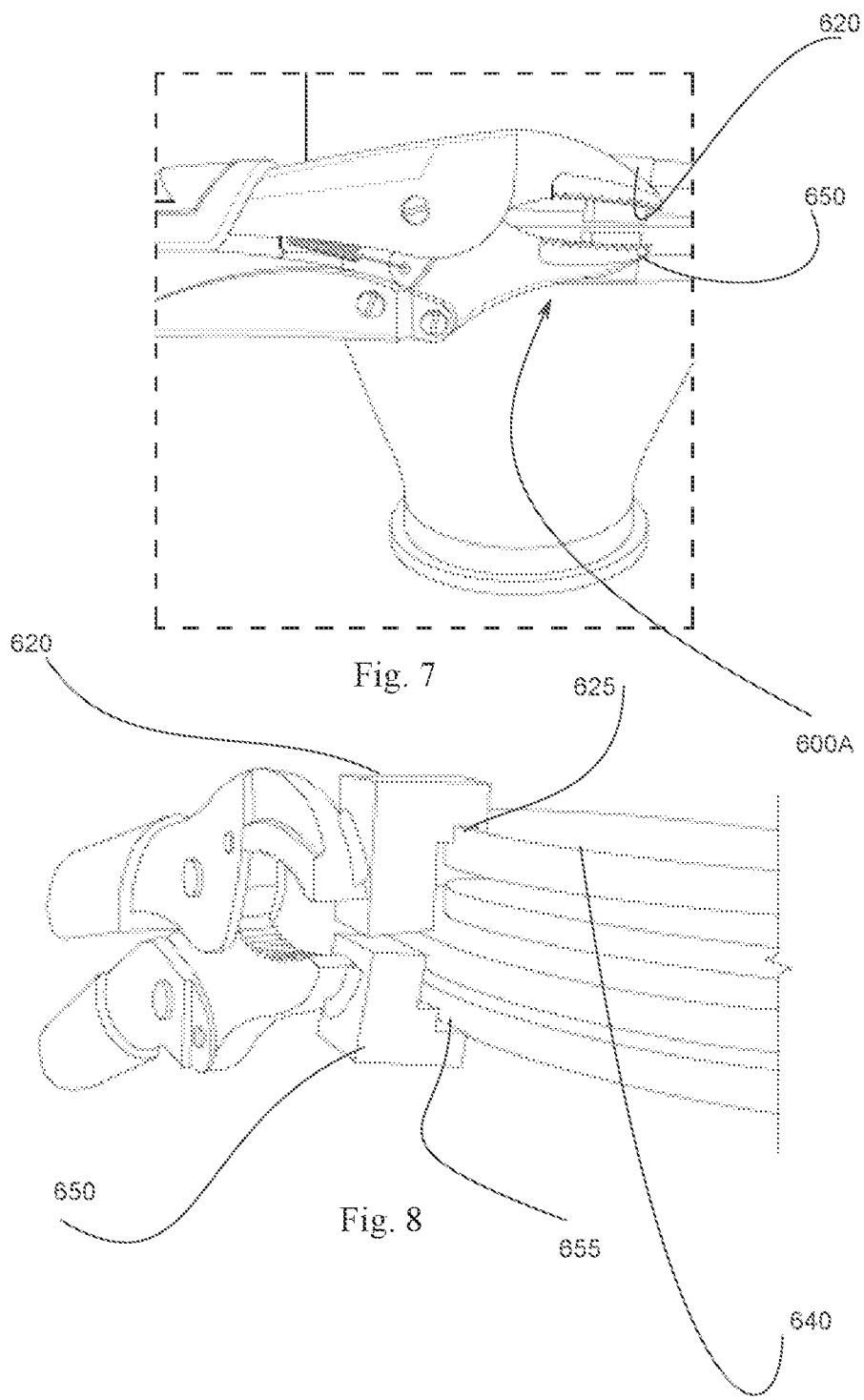
FIG. 7 is a side view of the ISO clamp.
FIG. 8 is a side view of the ISO in use on the joined sections of a pipe

Now referring to FIGS. 7-8 which shows a side view of the alignment bracket clamp drawing together two pipe flanges. The alignment bracket clamp is opened and the alignment slots 625,655 are placed over the flanges. The grips of the alignment bracket clamp are compressed drawing the flanges together. When the locking plier "grips" or "locks" the pipe alignment clamp has set the two pipes in place allowing the technician or engineer to set and install the ISO double clamps over the flange lips and tighten the two pipe ends with bolts. As shown in FIG. 8, once the bolts are tightened and set, the pipe alignment clamp may be released and used again.

While the invention has been particularly shown and described with reference to exemplar embodiments, it will be understood by those skilled in the art that various changes in form and detail may be made therein without departing from the spirit and scope of the invention. Many variations may be made to the embodiments described herein. All variations are intended to be included within the scope of this disclosure. The description of the embodiments herein can be practiced in many ways. Any terminology used herein should not be construed as restricting the features or aspects of the disclosed subject matter. The scope should instead be construed in accordance with the appended claims.

I claim:

1. A pipe holding and alignment tool for the joining of two pipes with flanges comprising:
    an alignment clamp having a first clamping teeth and a second clamping teeth for the gripping of outer surfaces of flanges attached to the end of pipes;
    an alignment spike operable for the insertion into a first flange bolt hole of the first pipe and then through to a second flange bolt hole of the second pipe; and
    the alignment spike further comprising a calibration mark;
    such that when the first pipe and the second pipe are clamped together, the alignment spike fixedly positions the first pipe proximate to the second pipe via the bolt hole.

2. The pipe holding and alignment tool for the joining of two pipes with flanges as in claim 1 where the alignment clamp is a locking plier.

3. The pipe holding and alignment tool for the joining of two pipes with flanges as in claim 1 where the alignment spike is a removable insert.

4. The pipe holding and alignment tool for the joining of two pipes with flanges as in claim 1 where the alignment spike is positioned at a displaced angle.

5. The pipe holding and alignment tool for the joining of two pipes with flanges as in claim 1 where the alignment clamp is selected from a group consisting essentially of: slip joint pliers, lineman's pliers, needle-nose pliers, bent-nose pliers, pincers, tongue and groove pliers, round-nose pliers.

6. The pipe holding and alignment tool for the joining of two pipes with slotted flanges as in claim 5 where the second alignment bracket is positioned at a displaced angle.

7. A pipe holding and alignment tool for the joining of two pipes with slotted flanges comprising:
    an bracket alignment clamp having a first clamping jaw with first clamping teeth and a second clamping jaw with second clamping teeth allowing for the simultaneous gripping of the outer surface of a first ISO flange attached to a first pipe and a second ISO flange attached to a second pipe,
    a first alignment bracket attached to the first clamping jaw operable for the placement onto a first lip of the first pipe ISO flange;
    a second alignment bracket operable for the and then through to a second flange bolt hole of the second pipe;
    so that when the first clamp jaw and second clamping jaw compressively move towards each other, the first pipe and second pipe are aligned.

8. The pipe holding and alignment tool for the joining of two pipes with slotted flanges as in claim 7 where the bracket alignment clamp is a locking plier.

9. The pipe holding and alignment tool for the joining of two pipes with slotted flanges as in claim 7 where the first alignment bracket is removable.

10. The pipe holding and alignment tool for the joining of two pipes with slotted flanges as in claim 7 where the second alignment bracket is removable.

11. The pipe holding and alignment tool for the joining of two pipes with slotted flanges as in claim 7 where the first alignment bracket is positioned at a displaced angle.

12. The pipe holding and alignment tool for the joining of two pipes with slotted flanges as in claim 7 where the first alignment bracket is movable.

13. The pipe holding and alignment tool for the joining of two pipes with slotted flanges as in claim 7 where the second alignment bracket is movable.

14. The pipe holding and alignment tool for the joining of two pipes with slotted flanges as in claim 7 where the alignment clamp is selected from a group consisting essentially of: slip joint pliers, lineman's pliers, needle-nose pliers, bent-nose pliers, pincers, tongue and groove pliers, round-nose pliers.

15. The pipe holding and alignment tool for the joining of two pipes with slotted flanges as in claim 7 where the alignment teeth are drawn together using attractive forces selected from a group consisting essentially of electromagnetic forces, and magnetic forces.

16. A pipe holding and alignment tool for the joining of two pipes with flanges comprising:

an alignment clamp having a first clamping teeth and a second clamping teeth for the gripping of outer surfaces of flanges attached to the end of pipes;

an alignment spike operable for the insertion into a first flange bolt hole of the first pipe and then through to a second flange bolt hole of the second pipe; and where the alignment teeth are drawn together using attractive forces selected from a group consisting essentially of electromagnetic forces, and magnetic forces;

such that when the first pipe and the second pipe are clamped together, the alignment spike fixedly positions the first pipe proximate to the second pipe via the bolt hole.

17. The pipe holding and alignment tool for the joining of two pipes with flanges as in claim 16 where the alignment clamp is a locking plier.

18. The pipe holding and alignment tool for the joining of two pipes with flanges as in claim 16 where the alignment spike is a removable insert.

19. The pipe holding and alignment tool for the joining of two pipes with flanges as in claim 16 where the alignment spike is positioned at a displaced angle.

20. The pipe holding an alignment tool for the joining of two pipes with flanges as in claim 19 where the alignment spike further comprises a calibration mark.

21. The pipe holding and alignment tool for the joining of two pipes with flanges as in claim 16 where the alignment clamp is selected from a group consisting essentially of: slip joint pliers, lineman's pliers, needle-nose pliers, bent-nose pliers, pincers, tongue and groove pliers, round-nose pliers.

* * * * *